Oct. 24, 1933.   G. F. BIBB   1,932,170
BROILER MECHANISM FOR COMBINATION RANGES
Filed April 5, 1932   2 Sheets-Sheet 1
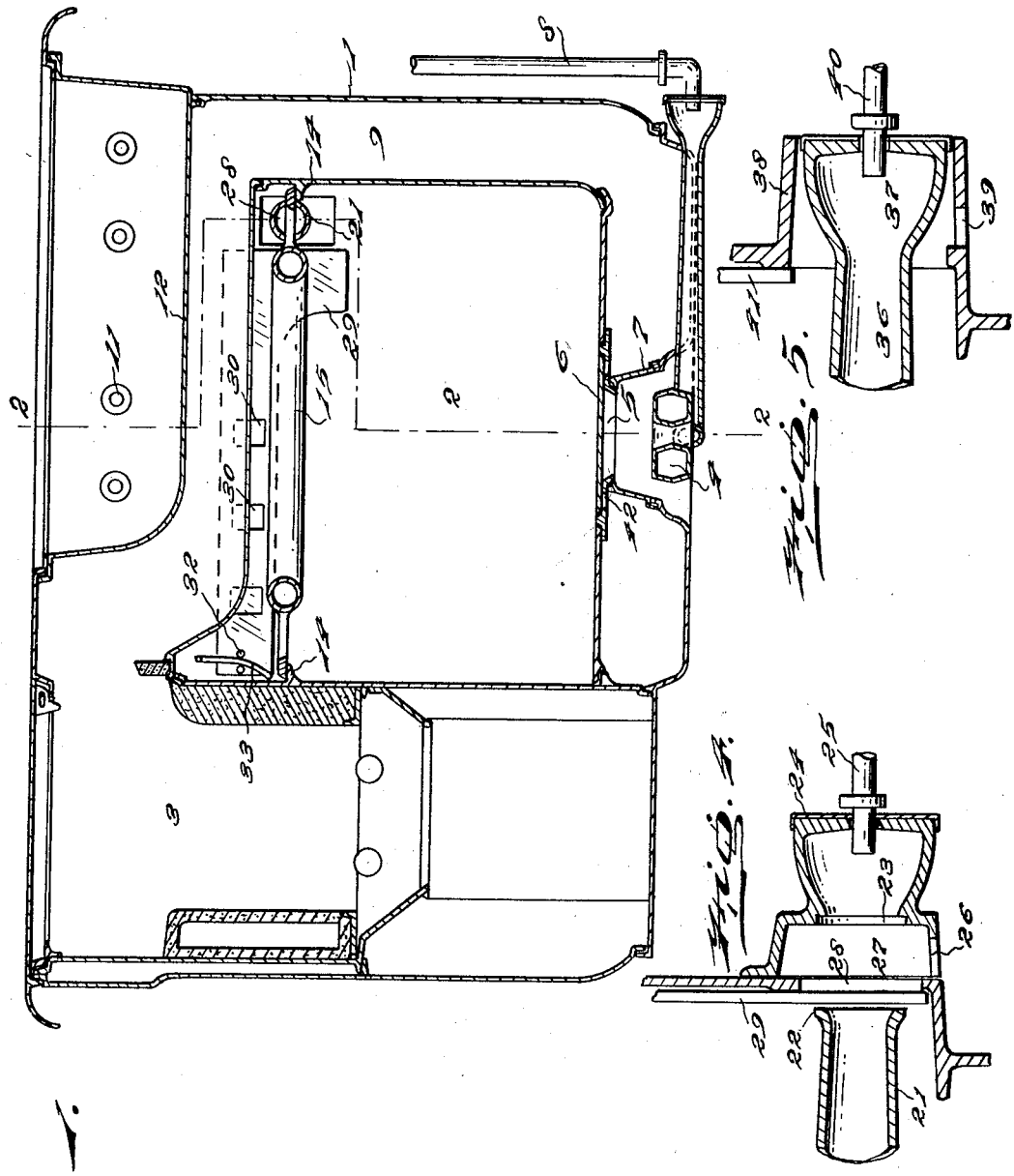
INVENTOR.
George F. Bibb
BY
Herbert S. Fairbanks
ATTORNEY.

Oct. 24, 1933.　　　　　G. F. BIBB　　　　1,932,170
BROILER MECHANISM FOR COMBINATION RANGES
Filed April 5, 1932　　　2 Sheets-Sheet 2
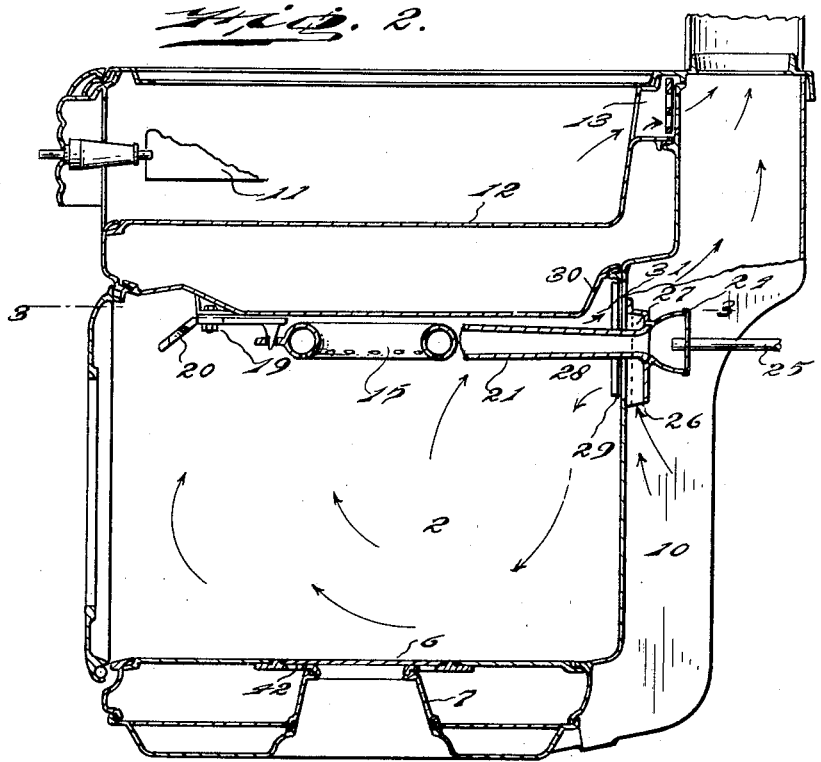
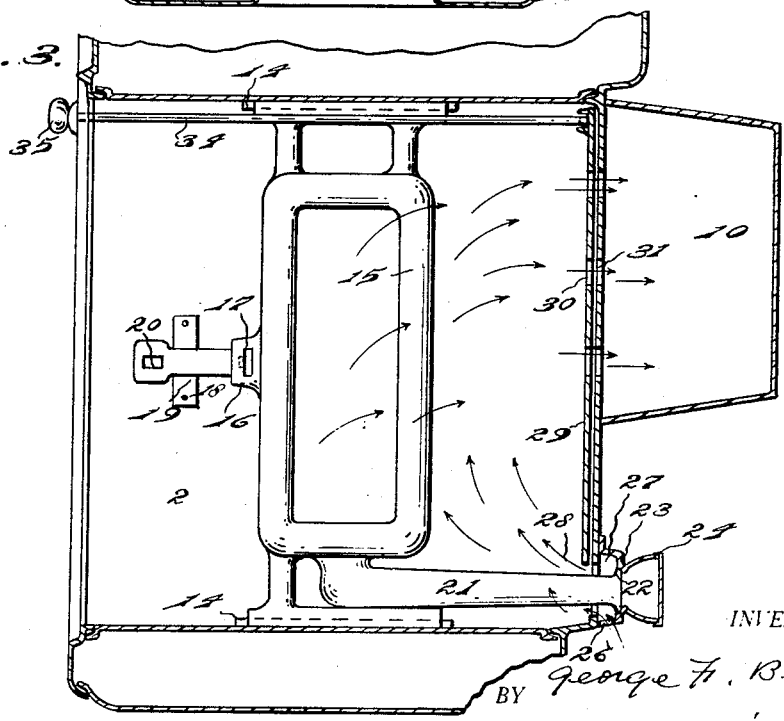
INVENTOR.
BY George F. Bibb
Herbert S. Fairbanks
ATTORNEY.

Patented Oct. 24, 1933

1,932,170

UNITED STATES PATENT OFFICE 1,932,170

BROILER MECHANISM FOR COMBINATION RANGES

George F. Bibb, Troy, N. Y., assignor to The Floyd-Wells Company, Royersford, Pa., a corporation of Pennsylvania Application April 5, 1932. Serial No. 603,386

10 Claims. (Cl. 126—36)

The object of this invention is to devise novel broiler mechanism for ranges having a common baking oven which can also be employed as the oven for the broiler. To this end a broiling mechanism is adjustably mounted to provide for secondary air being admitted to the broiler and at the same time automatically venting the broiler into the back flue of the range. When it is desired to use the oven for baking the broiler burner is moved into a position which will permit the closure of the broiler vent damper, and prevent the possibility of lighting the broiler burner.

My present invention is designed to be employed in conjunction with a baking oven adapted to be internally heated by gas, and also if desired, in conjunction with a baking oven adapted to be externally heated by the products of combustion from a coal fire passing around it to the exit flue of the range.

A further object of the invention is to devise a novel construction range wherein a common oven may be employed for baking and broiling, and wherein the broiler burner cannot be lighted unless the oven is vented and provision is present for admission of air to the oven.

With the above and other objects in view, as will hereinafter more clearly appear, my invention comprehends a novel combination range in conjunction with which novel broiler mechanism is employed, the broiler mechanism being effective to automatically control admission of air to the oven and also the venting of the oven so that the burner of the broiler cannot be lighted unless such conditions are present.

It further comprehends a novel construction and arrangement of broiler mechanism and novel means for changing its position in accordance with whether the oven is to be used for broiling or to be used for baking.

It further comprehends novel damper mechanism which can be positioned to automatically control the operativeness or inoperativeness of the broiler burner.

It further comprehends novel means for venting the oven.

It further comprehends a novel combination range having a convertible oven for baking or broiling in which the mixer head may be either separate from or attached to a tube connected with the broiler, with means being provided to automatically control the introduction of secondary air and the venting of the oven.

It further comprehends novel means to limit the movement of the broiler mechanism.

Other novel features of construction and advantage will hereinafter more clearly appear in the detailed description and the appended claims.

For the purpose of illustrating the invention I have shown in the accompanying drawings typical embodiments of it, which, in practice, will give reliable and satisfactory results. It is, however, to be understood that these embodiments are typical only and that the various instrumentalities of which my invention consists can be variously arranged and organized, and the invention is not limited to the precise arrangement and organization of these instrumentalities as herein set forth.

Figure 1 is a sectional front elevation of a combination range in conjunction with which broiler mechanism embodying my invention is employed.

Figure 2 is a sectional elevation, the section being taken substantially on line 2—2 of Figure 1.

Figure 3 is a transverse section, the section being taken substantially on line 3—3 of Figure 2.

Figure 4 is an enlarged sectional view showing more particularly the burner tube separated from the mixer head and the vent damper in closed position.

Figure 5 is a sectional view of another embodiment of my invention in which the mixer head is integral with the broiler burner tube.

Similar numerals of reference indicate corresponding parts.

Referring to the drawings:

1 designates the outer case of a combination range embodying my invention which is provided with a common baking and broiling oven 2. When used for baking the oven is adapted to be heated either by products of combustion passing around it from the combustion chamber 3 of a coal fire, or by the heat from a gas burner 4 located beneath the bottom of the oven below an opening 5, which is controlled by means of a removable cover 6. The gas burner 4 extends into the burner casing 7 through which atmospheric air is admitted for primary combustion, the gas being conducted to the burner from the gas pipe 8. The products of combustion from the combustion chamber 3 pass through the passage 9 around the oven and through the exit 10 in the usual manner.

11 designates the top open burners located within the casing 12 which communicates by means of a vent 13 with the exit flue 10. The opposite side walls of the oven 2 near its upper end are provided with the inwardly extending track forming ribs 14 on which the broiler burner 15 is slidably mounted. The broiler burner is positioned manually and is provided at its forward end with an apertured lug 16 into which extends a lug 17 secured to a handle 18, slidably mounted on a bracket 19, which latter, as illustrated, serves as a stop to limit the extent of forward movement of the broiler burner 15. The free end of the handle 18 is deflected downwardly and apertured as at 20 so that it may be operated by a handle or a suitable tool may be inserted into the aperture 20. The broiler burner is provided with a rearwardly extending burner tube 21 which, at its rear end, is outwardly flared and provided with the angular shoulder 22 which in its rearmost position is adapted to seat in the angular recess 23 of the mixer head 24 into which extends the gas pipe 25. The joint between the broiler burner tube 21 and the mixer head 24 is located at the vacuum creating portion, anterior to the throat formed by the mixer head and such tube. This obviates the possibility of leakage at this point and ensures proper injection of the combustible material. The mixer head, as illustrated, is connected with the oven wall although, if desired, it may be connected with the burner tube 21 as shown in Figure 5. The mixer head is provided with an opening 26 for secondary air which communicates with the chamber 27 which communicates by means of the opening 28 with the chamber of the oven 2. This opening 28 is controlled by a damper 29 slidably mounted and provided with vent openings 30 which are adapted to be brought into registry with vent openings 31 which open into the exhaust flue 10. The damper 29 at one end is provided with the studs or pins 32, see Figure 1, between which the downwardly deflected curved end 33 of a damper rod 34 extends, this damper rod extending through the front wall of the casing and being provided with an actuating handle 35 by means of which the damper 29 is moved into its different positions. In Figure 3, the broiler burner is shown in broiling position.

When the burner 15 is in its rearward position, it is in its broiling position, and, when drawn forwardly, it is out of broiling position and will not interfere with the use of the oven for baking. Before the broiler burner 15 can be pushed back into position to broil, it is necessary to open the damper 29 so that air for secondary combustion will be admitted to the burner through the openings 26, chamber 27 in the mixer head, and opening 28 into the oven, the oven being vented through ports 30 and 31. When the damper 29 is in its closed position, it is impossible to light the broiler burner. When the damper 29 is in an open position, the broiler burner can be pushed back and the burner tube 21 will pass through the opening 28 for secondary air and make connection with the mixer head 24 and will then be ready for lighting. The vent openings and the opening for secondary air intake 28 open together and also close together. The admission of air to the secondary air intake 26 takes the air from outside.

In Figure 5, the broiler burner tube 36 is integral with the mixer head 37 which is movable into and from the casing exterior 38 having a secondary air intake opening 39. 40 is the gas feed line. 41 is the damper operating in the same manner as the damper 29 so that when the damper is closed, the broiler burner cannot be moved rearwardly or lit.

When the oven is used for baking, the cover 6 is moved away from the opening 5 and the oven is vented through the ports 42 which are closed by the cover 6 when the latter is in closed position over the opening 5.

The mixer head and the burner tube form in effect a sectional burner tube, the sections of which are relatively movable to prevent the lighting of the burner and to enable the burner to be lit.

In accordance with this invention, I provide means for converting an oven from a bake oven into a broiler oven so that the mechanism will be fool-proof and there can be no opportunity for lighting unconsumed gases in the chamber of the oven.

It will now be apparent that I have devised a new and useful broiler mechanism for combination ranges which embodies the features of advantage enumerated as desirable in the statement of the invention and the above description, and while I have, in the present instance, shown and described preferred embodiments thereof which will give in practice satisfactory and reliable results, it is to be understood that these embodiments are susceptible of modification in various particulars without departing from the spirit or scope of the invention or sacrificing any of its advantages.

Having thus described my invention what I claim as new and desire to secure by Letters Patent, is:—

1. A convertible baking or broiling oven for ranges comprising means to heat the oven for baking, a broiler burner movable into and out of lighting position, and means controlling admission of air to the oven and the venting of the oven, said broiler burner being incapable of being moved into lighting position when said means is closed.

2. A convertible baking or broiling oven for ranges comprising means to heat the oven for baking, a broiler burner movable into and out of broiling position, and a damper controlling admission of air to the oven and the venting of the oven, and preventing when closed the movement of the broiler burner into broiling position and thereby the lighting of the broiler burner.

3. A convertible baking or broiling oven for ranges having a secondary air intake opening and vent ports, means to heat said oven for baking, a broiler burner in said oven, movable into and out of broiling position, and a single damper controlling said vent ports and said secondary air intake opening, and controlling the movement of said burner into broiling position.

4. A convertible baking or broiling oven for ranges having a secondary air intake opening and vent ports, means to simultaneously open or simultaneously close said vent ports and intake opening, and a broiler burner incapable of being lit when said vent ports and secondary intake opening are closed.

5. A convertible baking or broiling oven for ranges having a secondary air intake opening and vent ports, means for heating said oven for baking, a broiler burner movably mounted within said oven and having a burner tube movable through said air intake opening when in broiling position, means to supply fuel to said broiler burner tube, and means to simultaneously open or simultaneously close the vent ports and air intake opening, said closing and opening means preventing the passage of fuel to said tube and thereby to the burner when said vent ports and intake opening are closed.

6. A convertible baking or broiling oven for ranges having controllable vent ports, a secondary air intake opening and an exit flue, means to heat said oven for baking, a manually actuated damper controlling said vent ports and intake opening, a broiler burner slidably mounted in said oven and movable into and out of broiling position, means to feed fuel to said broiler burner when in broiling position, said damper when closed preventing the feed of fuel to said broiler burner, and venting such fuel exterior of the range.

7. A convertible baking or broiling oven for ranges having vent ports, a broiler burner within said oven, a mixer head to feed fuel to said burner and having a secondary air intake opening adapted to communicate with said oven, a damper controlling said air intake opening and said vent ports, and means to feed fuel to said mixer head.

8. A convertible baking and broiling oven for ranges having vent ports and a secondary air intake opening, means to heat said oven for baking, a broiler burner having a tube and a mixer head capable of relative movement, means to feed combustible mixture to said mixer head, and a damper controlling said vent ports and secondary air intake opening.

9. A convertible baking and broiling oven for ranges having vent ports and a secondary air intake opening, a broiler burner having a tube having a throat and a relatively movable mixer head forming when in contact with the tube a joint at the vacuum creating portion of the tube and head anterior to the throat of the tube, and means to control said vent ports and intake opening.

10. A broiler oven for ranges, having vent ports and a secondary air intake, a broiler burner, a fuel feed pipe having relative movement with respect to said burner to render the feed pipe effective or ineffective to feed fuel to the burner, a valve controlling said fuel feed pipe, and means to control said secondary air intake and to vent the fuel to the atmosphere if fuel is being fed through said feed pipe and said secondary air intake is closed.

GEORGE F. BIBB.